July 11, 1950 W. A. HARRIS, SR 2,514,641
WORK HOLDING MEANS
Filed April 14, 1947
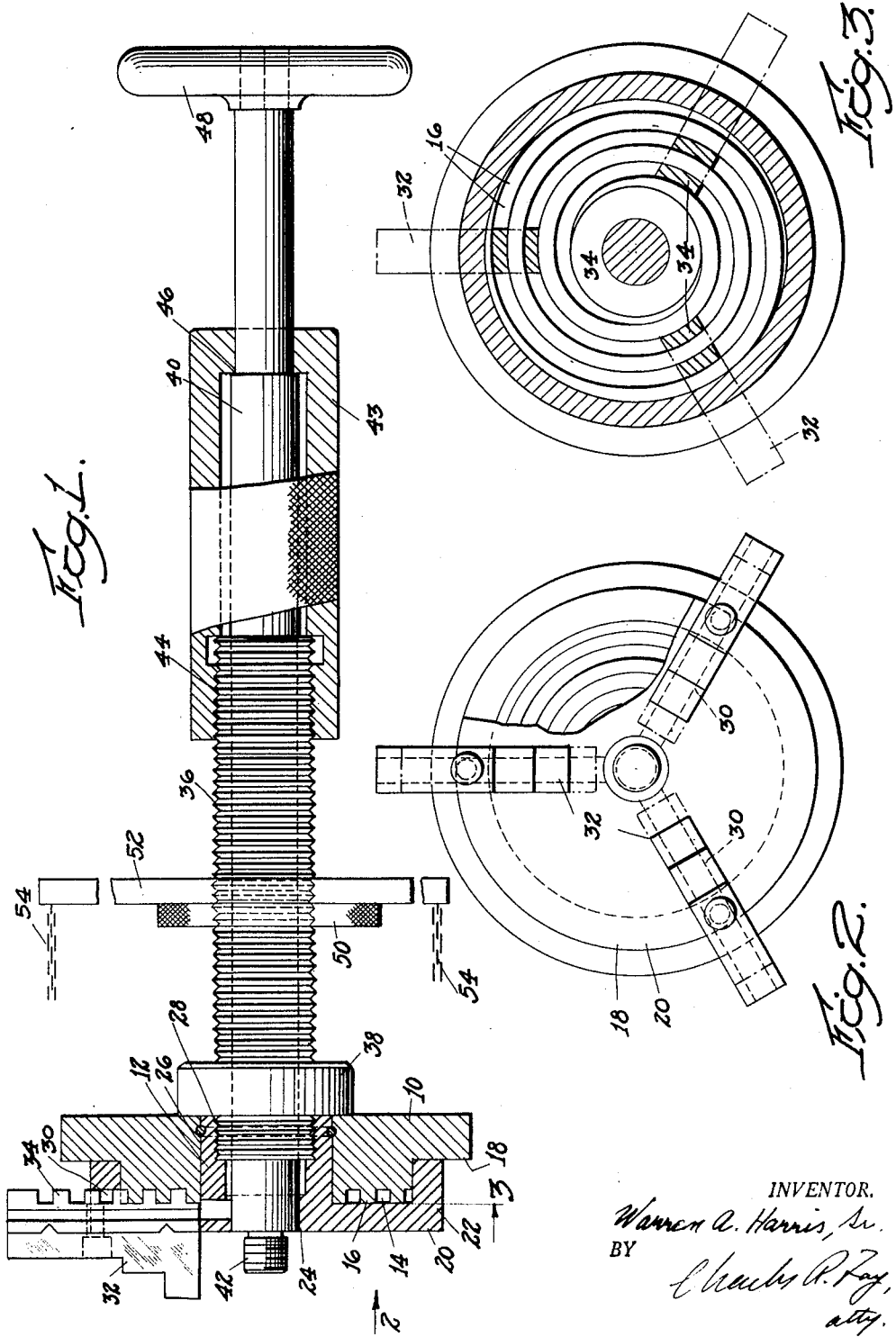
INVENTOR.
Warren A. Harris, Sr.
BY
Charles R. Ray,
atty.

Patented July 11, 1950

2,514,641

UNITED STATES PATENT OFFICE 2,514,641

WORK HOLDING MEANS

Warren A. Harris, Sr., Orange, Mass.

Application April 14, 1947, Serial No. 741,144

3 Claims. (Cl. 90—12.5)

This invention relates to new and improved work holding means or chucks and the principal object of the invention is to provide a device of this nature which is extremely easy in operation and construction and which is inexpensive to manufacture.

Further objects of the invention include the provision of a work holder comprising but two parts and a plurality of jaws, one part comprising a plate having a central opening therethrough and spiral flat teeth on a face thereof; the other part comprising a plate having a smaller central opening surrounded by a flange which fits into the opening of the first plate for attachment to an arbor, head stock spindle, or the like, said second plate being provided with radial grooves for the reception of work holding jaws, the latter being provided with teeth meshing with the spiral grooves in the first plate whereby the second plate may be secured in position and the first plate rotated thereon to simultaneously adjust the work holding jaws radially of the chuck.

Further objects of the invention include the provision of a chuck as above described in combination with a tool adapted to be threaded in the chuck and having means thereon for securing a work piece in operative position to the chuck, said tool being provided with means for working on the work piece when the latter is secured to the chuck.

Other objects and advantages of the invention will appear hereinafter.

Reference is to be had to the accompanying drawings in which:

Fig. 1 is a sectional view through the work holder and tool showing the same in operative position;

Fig. 2 is a view in end elevation looking in the direction of arrow 2 in Fig. 1; and Fig. 3 is a section on line 3—3 of Fig. 1.

For the purpose of carrying out this invention there is provided a plate 10 having a central opening therethrough as indicated at 12. Plate 10 is provided at one face thereof with a spiral groove, as indicated at 14, forming spiral teeth 16. The portion of plate 10 in which the spiral groove is located extends laterally outwardly from the main body of the plate, forming a shoulder at 18.

Another plate 20 is provided with a peripheral flange 22 adapted to seat on the shoulder 18 as shown in Fig. 1. Plate 20 is provided with a central opening as at 24 and a central flange 26 which may be interiorly threaded as at 28. The flange 26 fits into the opening 12 in the plate 10 so that the latter is rotatable on the flange 26.

Plate 20 is also provided with a series of radial grooves 30 for the sliding reception of work holding jaws 32, these jaws being more or less conventional and being provided with teeth 34 which are located in the groove 14.

It will be seen that if plate 20 be held stationary and plate 10 rotated thereon, the jaws 32 will be adjusted radially in and out relative to the center so as to hold a work piece therebetween or thereon.

There is also provided a threaded sleeve 36 which may be threaded onto the threads 28 of flange 26, and a collar 38 is provided on threaded sleeve 36 for the purpose of holding plate 10 in the position shown in Fig. 1. A shaft 40 is provided extending through the sleeve 36 and this shaft may have means 42 for securing a tool thereto. The means 42 is here shown as threaded but may take the form of a collet or the like. A bushing 43 is threaded as at 44 to sleeve 36 and journals the shaft 40 on a shoulder as at 46. Shaft 40 may be provided with a handle 48 for turning the same and feeding axially as limited by the position of the bushing 43.

Another collar 50 meshes with sleeve 36 and locates a rod or bar 52, the ends of which are provided with flexible chains or cords 54 forming a part of a sling which may be placed under or around a work piece held by jaws 32. The sling may either hold such a work piece against the chuck using the jaws to center the work or the jaws may actually hold the work.

In the use of the device it will be seen that a comparatively small work piece may be held and worked on by a tool secured to the means 42 such, for instance, as a valve seating tool or the like.

Having thus described my invention and the advantages thereof, I do not wish to be limited to the details herein disclosed otherwise than as set forth in the claims, but what I claim is:

1. A device of the class described comprising a pair of plates one of which has an opening receiving a flange on the other plate for relative rotation thereof, a flange on said other plate in the opening, said flange extending therethrough, means on the flange for securement to a spindle so that the first plate is adjacent the same and the second plate more remote, radial grooves in the second plate, jaws in the grooves, a spiral groove in the first plate, teeth on the jaws engaging in the groove for radial adjustment of the jaws, a shaft threaded to the flange, a collar adjustably threaded on the shaft, a member supported on the collar, and a sling on the member.

2. The device of claim 1 wherein the shaft is hollow, and including a tool shaft therein for operation on a piece held to the jaws by the sling.

3. A chuck comprising a circular member, a peripheral flange on the member, the latter having a central aperture therethrough, an inner flange surrounding the aperture, the inner flange being longer than the peripheral flange, means in the inner flange for attachment thereto of a spindle or the like, the two flanges being at the same side of the member and together forming an annular recess or track at the flanged side thereof, a series of radial slots in the member intersecting the recess, a second circular member having a central but larger aperture receiving the inner flange on the first member, a circular raised portion at a side surface of the second member, said raised portion being received within the annular recess and having a diameter less than that of the peripheral flange, said raised portion having a spiral flat groove therein, and a jaw in each slot, each jaw having teeth each of which is set into a different run of the spiral groove.

WARREN A. HARRIS, Sr.

REFERENCES CITED

The following references are of record in the file of this patent:

UNITED STATES PATENTS

| Number | Name | Date |
| --- | --- | --- |
| 1,321,855 | Singleton | Nov. 18, 1919 |
| 1,560,048 | Fingerle | Nov. 3, 1925 |